Patented Dec. 3, 1940

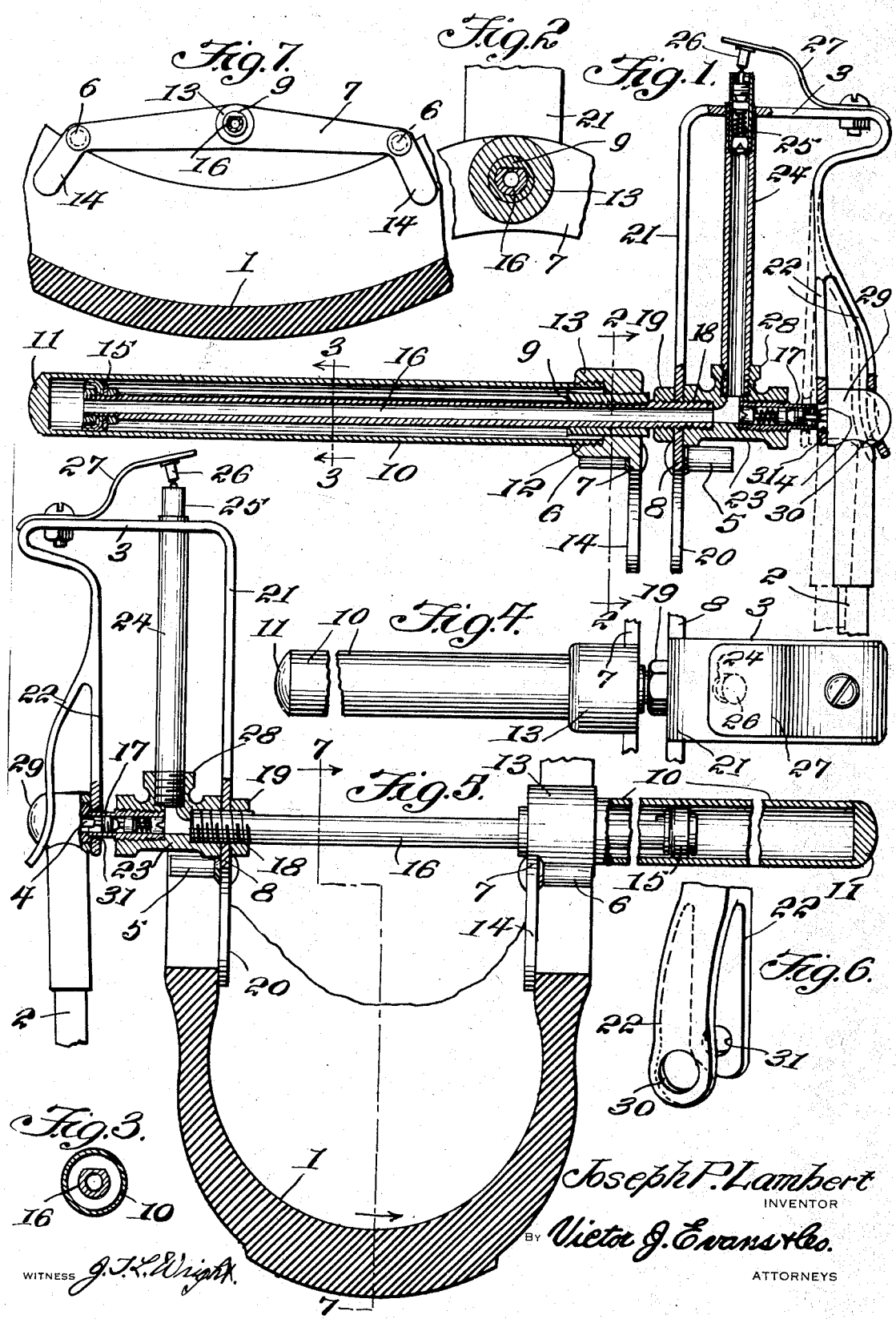

2,223,915

UNITED STATES PATENT OFFICE 2,223,915

TIRE SPREADER

Joseph P. Lambert, Wapato, Wash.

Application August 10, 1939, Serial No. 289,497

3 Claims. (Cl. 81—15.3)

This invention relates to tire spreaders of the type in which the spreading jaws are operated pneumatically to separate the sides of tires to enable the insertion or withdrawal of inner tubes as well as to facilitate inspection of the inner surface of the tire.

An object of the present invention is to provide a tire spreader of this type which embodies a novel grip or handle having a resilient member adapted to be conveniently depressed by the operator's hand to open the air release valve and permit the resiliency of the tire to return the spreader jaws to normal position after each operation.

A further object of the invention is to provide a portable device of this character which may utilize for its operating power any source of air pressure available at a service station and which will engage the tire beads at spaced points longitudinally of the tire to open a long portion of the tire for facilitating quick inspection of the entire tire.

A further object of the invention is to provide a device of this character which will be formed of a few strong, simple and durable parts which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view of a tire spreader constructed in accordance with the invention and shown in normal released position.

Figure 2 is a fragmentary cross sectional view taken on the line 2—2 of Figure 1 looking in the direction of the arrowheads.

Figure 3 is a detail cross sectional view taken on the line 3—3 of Figure 1 looking in the direction of the arrowheads.

Figure 4 is a top plan view of the tire spreader shown in Figure 1 with portions broken away.

Figure 5 is a side elevation of the tire spreader, with portions broken away, and shown in applied position to spread a tire at the bead portions thereof.

Figure 6 is a detail perspective view of the lower portion of the grip or handle.

Figure 7 is a longitudinal sectional view taken on the line 7—7 of Figure 5 showing the gripping elements or jaws engaging the bead portions of the tire at spaced points longitudinally thereof to spread a long portion of the tire.

Referring now to the drawing in which like characters of reference designate similar parts in the various views, 10 designates a cylinder having one end closed as shown at 11 and having the opposite end threaded as shown at 12. A sleeve 13 is threaded onto the threaded end of the cylinder and is equipped with a jaw member 7, best shown in Figures 1 and 5, adapted to extend longitudinally of the bead portion of one side of a tire 1. The jaw member is provided at the ends with downwardly inclined fingers 14 which engage the inner surface of the tire at the bead portion. A stop lug 6 extends upwardly from the upper end of each finger to engage the inner periphery of the bead portion of the tire and prevent the fingers from being inserted too deep into the tire.

Slidably mounted within the cylinder is a hollow piston rod 16 equipped at one end with a piston 15. The opposite end of the piston rod is slidably mounted in a bushing 9 and both the bushing and the piston rod are provided with contacting flat surfaces best shown in Figures 2 and 3 to prevent rotation of the piston during its sliding movement. The bushing is fixedly secured in the sleeve 13 and forms a bearing for the piston rod during its endwise sliding movement.

The piston rod projects beyond the bushing 9 and is threaded, as shown at 18, to receive one branch of a T-coupling 23. A check valve 17, similar to a conventional tire valve, is disposed in the aligned branch of the T-coupling and adapted to be opened, as later described, to admit air pressure to the interior of the cylinder against the piston.

The lateral branch of the T-coupling is provided with a vent pipe 24 which extends at a right angle to the piston rod and is equipped at its outer end with a check valve 25 similar to a tire valve. The check valve may also be opened, as will later be described, to permit escape of air pressure from the interior of the cylinder.

A grip or handle 21, in the nature of a flat bar, is provided with an opening to receive the threaded end of the piston rod and a jam nut 19 is threaded on the piston rod to secure the handle tight against the T-coupling as best shown in Figures 1 and 5. The T-coupling is provided at the bottom with a jaw member 8, best shown in Figure 7, and which extends longitudinally of the bead portion of the other side of the tire from the jaw member 7. The jaw member 8 terminates at the ends in downwardly extending fingers 20 which engage the bead portions of the tire at spaced points longitudinally thereof and coact with fingers 14 in spreading a long portion of the tire wide open when air is admitted to the cylinder against the piston, as will presently be described. A stop lug 5 projects outwardly from the upper end of each finger to engage the inner periphery of the bead portion of the tire and prevent the fingers being inserted too deep within the interior of the tire.

The handle 21 is provided at the upper end with a cross bar 3 which is perforated to receive the upper end of the vent pipe 24 and is then directed downwardly substantially parallel with the portion 21 of the handle and terminates in a fork having branches 22. The fork of the handle is adapted to receive the so-called air chuck 29, which is substantially a valve casing in which is disposed a valve 4 somewhat similar to a tire valve. The air chuck is secured to the free end of an airhose 2 of the conventional type to be found at filling stations. To receive the air chuck both branches 22 of the fork are provided with openings, the innermost branch being provided with an opening 30 which receives the conventional pins of the air admission valve 17 of the piston and of the check valve in the air chuck when the handle is compressed by the operator's closed hand from the full line position to the dotted line position shown in this Figure 1. The opening 31 of the other fork receives the rounded end of the air chuck and insomuch as the outer branch of the fork is resilient the air chuck will be held by the yoke releasably in place.

The cross bar 3 of the handle or grip member is equipped with a leaf spring 27 which is provided at the outer end with a pin 26 adapted to engage the air release valve 25 when the operator depresses the leaf spring with his thumb.

In operation, assuming the parts are in normal position as shown in Figure 1, the operator grasps the fork and the handle 21 with his fingers and thumb closed thereupon, and then inserts the fingers of the jaw members 7 and 8 between the bead portions of the tire 1. Next the operator closes the ball of the hand upon the fork 22 to deform the yoke from the full line position to the dotted line position shown in Figure 1, during which operation the opening 20 of one branch of the yoke receives the casing of the air admission valve 17 and the pins of both the air admission valve and the air chuck valve are brought into engagement to open both valves and permit air to enter the piston stem and escape therefrom between the closed end 11 of the cylinder and the piston 15. The incoming air accumulates between the piston 15 and closed end of the cylinder with the result that the cylinder and the piston are moved endwise apart from each other with resultant spreading apart of the bead portions of the tire as best shown in Figure 5. When the tire is spread sufficiently to permit inspection and repairs, the operator may release pressure of the ball of his hand against the fork branches 22 and remove his hand from the grip. During this operation the resiliency of the fork returns the fork to initial position and carries the air chuck out of engagement with the air admission valve thereby shutting off the air.

The tire is held in spread-open position as long as may be necessary and when repairs or other work has been completed, the operator again grasps the handle between the fingers and ball of the hand and with the thumb depresses the leaf spring 27 to bring the pin 26 into engagement with the release valve 25 of the vent pipe 24 and opens the valve, thus permitting the air to escape from the interior of the cylinder and from the hollow stem of the piston through the vent pipe. During this release of the air, the resiliency of the bead portions of the tire, that is the tendency of these portions to return to normal position, forces retrograde endwise movement of the cylinder and piston to return the jaw members to the initial position shown in Figure 1.

From the above description it is thought that the construction and operation of the invention will be fully understood without further explanation.

What is claimed is:

1. A tire spreader comprising a relatively movable piston and cylinder, a hollow piston rod for the piston, tire bead engaging means carried by the piston rod and the cylinder for spreading the tire when the cylinder and piston are moved endwise oppositely to each other, a T-coupling carried by the piston rod, an air admission valve carried by the coupling for admitting air to the cylinder beyond the piston, the air admission valve and the closed end of the cylinder being on opposite ends of the piston, a vent pipe carried by the lateral branch of the coupling and extending at a right angle to the piston rod, a substantially U-shaped handle having the cross bar thereof secured to the vent pipe at the outer end thereof, a leaf spring carried by said cross bar adapted to be deformed by pressure of an operator's hand, a pin carried by the free end of the leaf spring, and a valve in the upper end of the vent pipe underlying said pin and adapted to be engaged by said pin to open the valve and release air pressure from within the cylinder, one leg of the handle terminating in a fork, said fork being located adjacent to said air admission valve disposed in one leg of the T-coupling, the legs of the fork being resiliently connected and spaced apart a sufficient distance to receive a conventional air hose chuck between them so that they can be moved relatively to each other when pressure of the operator's hand is exerted thereon to deform the fork to thereby move the chuck toward the air admission valve for admitting air to the cylinder.

2. A tire spreader comprising a cylinder, a piston in the cylinder, a hollow piston rod for the piston projecting exteriorly of the cylinder, tire bead engaging jaw members carried by the piston rod and by the cylinder adapted to spread open a tire when the piston rod and the cylinder are moved endwise oppositely to each other, a T-coupling carried by the piston rod, an air admission valve carried by the coupling for admitting air through the hollow piston rod to the cylinder beyond the piston, the air admission valve and the closed end of the cylinder being on opposite ends of the piston, a vent pipe carried by the lateral branch of the coupling and extending at a right angle to the piston rod, an air release valve in the upper end of the vent pipe, a handle of substantially inverted U form secured to the piston rod and to the vent pipe, said handle having a free leg terminating in a fork disposed adjacent the air admission valve, the legs of the fork being resiliently connected together and spaced apart and having openings to releasably receive a conventional air hose valve control chuck between the legs, the resilient legs being movable relatively to each other when pressure of the operator's hand is exerted thereon to deform the fork to thereby move the chuck toward the air admission valve for admitting air to the cylinder, a leaf spring carried by the handle, a pin on the free end of the leaf spring overlying said air release valve in the upper end of the vent pipe and adapted to engage the valve to open the air valve when the spring is deformed by pressure of an operator's hand to vent air from between the piston and the cylinder and permit resiliency of the tire to return the piston and the cylinder and the tire spreading jaws to normal position.

3. A tire spreader comprising a cylinder, a piston in the cylinder, a hollow piston rod for the piston projecting exteriorly of the cylinder, tire engaging members carried by the piston rod and the cylinder adapted to spread open the tire when the piston and the cylinder are moved relatively to each other, stop lugs carried by the jaw members adapted to engage the beads of a tire to limit insertion of the jaw members in the tire, a T-coupling carried by the piston rod, an air admission valve carried by the T-coupling for admitting air to the cylinder beyond the piston for moving the piston and cylinder relatively to each other, the air admission valve and the closed end of the cylinder being disposed on opposite ends of the piston, a vent pipe carried by the lateral branch of the coupling and extending at a right angle to the piston rod, a valve in the upper end of the vent pipe, a handle of substantially inverted U form secured to the piston rod and to the vent pipe, said handle having a free leg terminating in a fork disposed adjacent the air admission valve, the legs of the fork being resiliently connected together and spaced apart and having openings to releasably secure a conventional air hose valve control chuck between the legs, deforming of the handle by an operator's grip closing thereon moving the chuck to open said air admission valve, and a leaf spring carried by the handle terminating in an end overlying the air release valve and adapted to enter the pipe and open the air release valve when the leaf spring is deformed by pressure of an operator's hand to permit air being vented from between the piston and the cylinder so that the resiliency of the tire may return the piston and cylinder and the tire spreading position to normal position.

JOSEPH P. LAMBERT.